March 26, 1940.  W. HUFF  2,194,660

BICYCLE GUARD

Filed Nov. 7, 1938

Inventor
William Huff

By Clarence A. O'Brien
and Hyman Berman
Attorneys

Patented Mar. 26, 1940

2,194,660

UNITED STATES PATENT OFFICE 2,194,660

BICYCLE GUARD

William Huff, Asheville, N. C., assignor to Chirle Huff, Asheville, N. C.

Application November 7, 1938, Serial No. 239,356

1 Claim. (Cl. 280—152.2)

The present invention relates to new and useful improvements in guards particularly for bicycles and has for its primary object to provide, in a manner as hereinafter set forth, a device of this character embodying a novel construction, combination and arrangement of parts through the medium of which damage to the wheels and tires of a bicycle may be decreased.

Other objects of the invention are to provide a guard of the aforementioned character which will be comparatively simply in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
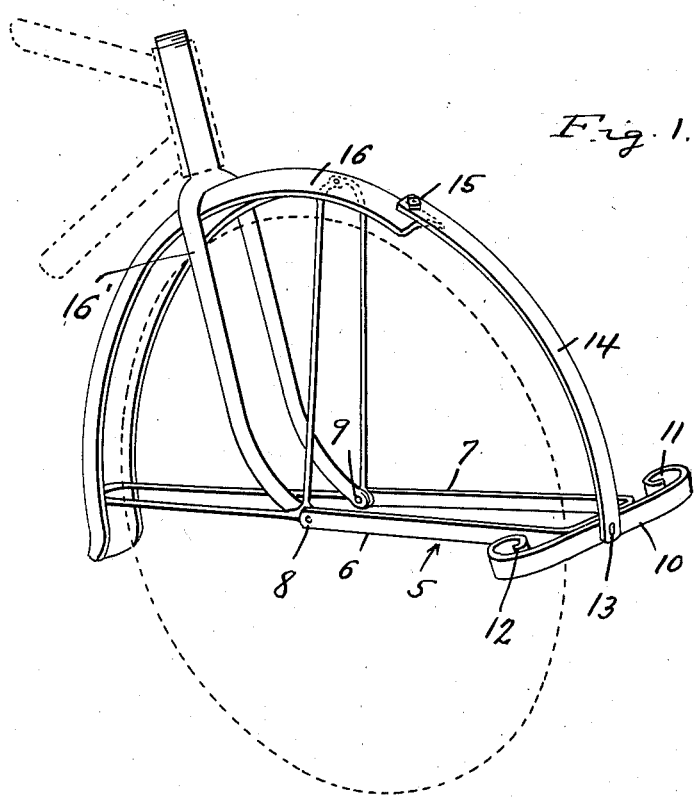
Figure 1 is a perspective view of the front portion of a bicycle to which the guard is fitted.

Referring now to the drawing in detail it will be seen that the reference numeral 5 in Fig. 1 designates generally a substantially U-shaped support constructed from a length of strap metal. The arms 6 and 7 of the U-shaped support 5 have holes 8 and 9 at their free end portions which are adapted to appropriately attach the U-shaped support 5 on the end portions of the usual front wheel axle (not shown).

A bar bumper 10 having convolute end portions 11 and 12 is mounted on the bight portion of the U-shaped support 5 and held securely thereto by a bolt or other suitable means 13.

An arcuate metallic hanger strap 14 is secured to the U-shaped support 5 and bar bumper 10 at its lower end portion by the same bolt 13, and supports and prevents the swinging downward of the bar bumper 10 and U-shaped support 5. The other end portion of the arcuate strap 14 is secured by a bolt 15, or other securing means, to the front end portion of the conventional mud guard 16 which is mounted on the fork 16'.

Figure 2:
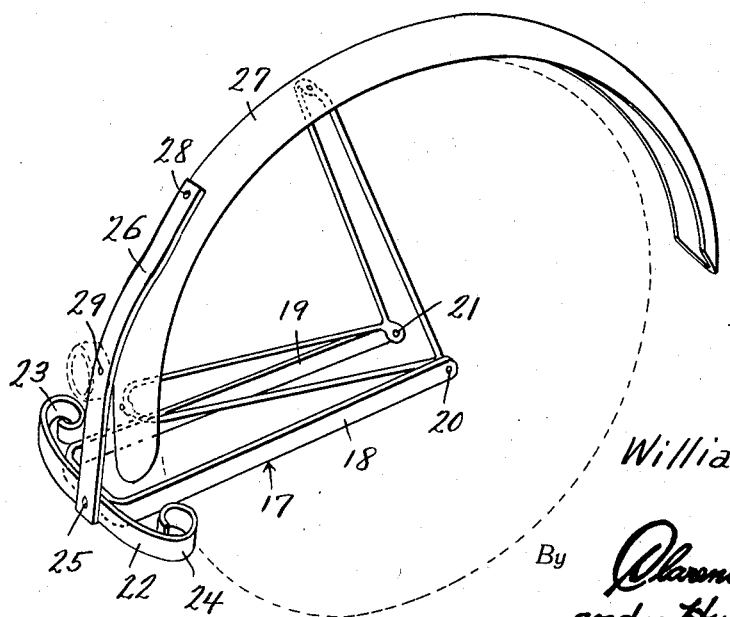
Figure 2 is a perspective view of a rear portion of a bicycle with the guard shown mounted thereon.

The back guard, shown in Figure 2 of the drawing, is substantially the same as the front guard in that it has a U-shaped support 17 constructed of a length of strap metal and is provided with arms 18 and 19 having holes 20 and 21 in their free end portions which engage the rear axle (not shown) of a bicycle to retain the U-shaped support thereon.

A bar bumper 22, constructed of a length of strap metal, has its end portions formed into convolute coils 23 and 24 is mounted on the U-shaped support 17 and held securely thereto by a bolt 25.

To prevent the U-shaped support 17 from swinging downward a curved tie or hanger strap 26 is secured at its lower end portion to the bar bumper 22 and U-shaped support 17 by a bolt 25, while the other end portion thereof is bolted or otherwise secured to the rear mud guard 27 as at 28. The strap 26 is spaced from the mud guard 27 throughout a greater part of its length and is provided with a hole 29, intermediate its end portions, through which a bolt (not shown) may pass for mounting a rear signal lamp 30 as shown in broken lines.

As will readily be seen, in a head-on collision the bar bumper 10 and U-shaped support 5 would receive the shock and thereby prevent injury to the front wheel and tire, while the rear bar bumper 22 and U-shaped support 17 would receive a shock from the rear.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention as claimed.

What is claimed is:

A bicycle wheel bumper guard comprising a U-shaped member of rigid construction and having the free ends of its limbs adapted to be connected to the ends of an axle of one of the wheels with said limbs and the bight forming a space through which a portion of the wheel passes, a horizontally arranged bumper bar extending across the bight of the U-shaped member with its ends extending beyond the bight, and an arcuate-shaped supporting bar having its lower end connected with the center of the bumper bar and the bight of the U-shaped member and its upper end adapted to be connected to a mud guard of the bicycle.

WILLIAM HUFF.